United States Patent [19]

Stringfellow et al.

[11] Patent Number: 5,456,468
[45] Date of Patent: Oct. 10, 1995

[54] VIDEO MONITOR INSERTION AND EXTRACTION MACHANISM FOR VIDEO GAME MACHINES

[75] Inventors: William J. Stringfellow, Roselle; Andrew Z. Sternal, Palatine; Joseph J. Strumach, Elmhurst; Wayne H. Rothschild, Wheeling, all of Ill.

[73] Assignee: WMS Gaming Inc., Chicago, Ill.

[21] Appl. No.: 122,339

[22] Filed: Sep. 17, 1993

[51] Int. Cl.⁶ ........................................ A63F 9/22
[52] U.S. Cl. ................... 273/148 B; 273/85 G; 312/222; 312/223.3; 248/917
[58] Field of Search .................. 273/434, 85 G, 273/DIG. 28, 148 B; 312/223.1, 223.2, 223.3, 7.2; 248/917, 919, 920

[56] References Cited

U.S. PATENT DOCUMENTS

| | | | |
|---|---|---|---|
| 4,245,871 | 1/1981 | Rex | 312/7.2 |
| 4,440,457 | 4/1984 | Fogelman et al. | 312/223.3 |
| 4,453,789 | 6/1984 | Gullong | 312/324 |
| 4,471,931 | 9/1984 | Covey et al. | 312/7.2 X |
| 4,616,218 | 10/1986 | Bailey et al. | 248/920 X |
| 4,640,199 | 2/1987 | Zigman | 312/223.3 X |
| 4,832,419 | 5/1989 | Mitchell et al. | 312/223.2 X |
| 5,033,804 | 7/1991 | Faris | 312/223.3 |
| 5,071,204 | 12/1991 | Price et al. | 312/223.3 |
| 5,118,172 | 6/1992 | Ugalde | 312/223.3 |
| 5,233,502 | 8/1993 | Beatty et al. | 248/917 X |

FOREIGN PATENT DOCUMENTS

| | | | |
|---|---|---|---|
| 0422510 | 4/1991 | European Pat. Off. | 312/223.3 |
| 0518261 | 12/1992 | European Pat. Off. | 312/223.3 |

*Primary Examiner*—Jessica J. Harrison
*Attorney, Agent, or Firm*—Rockey, Rifkin and Ryther

[57] ABSTRACT

The video game machine of the invention consists of a space located in the game cabinet for receiving the video monitor where a support plate is located on either side of the space and where each support plate includes a pair of tracks. The video monitor is provided with lugs extending from the sides of the monitors that face the support plates. The lugs engage the tracks such that the video monitor is supported and can be lowered into the cabinet gradually. A blind mating connector connects the video monitor to the logic for controlling the game.

33 Claims, 5 Drawing Sheets

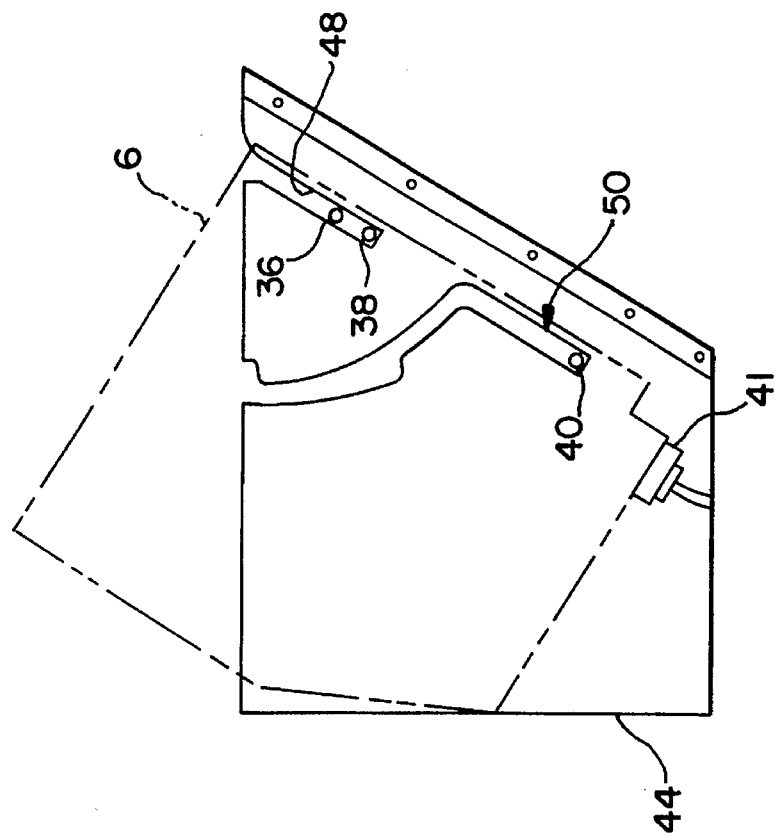
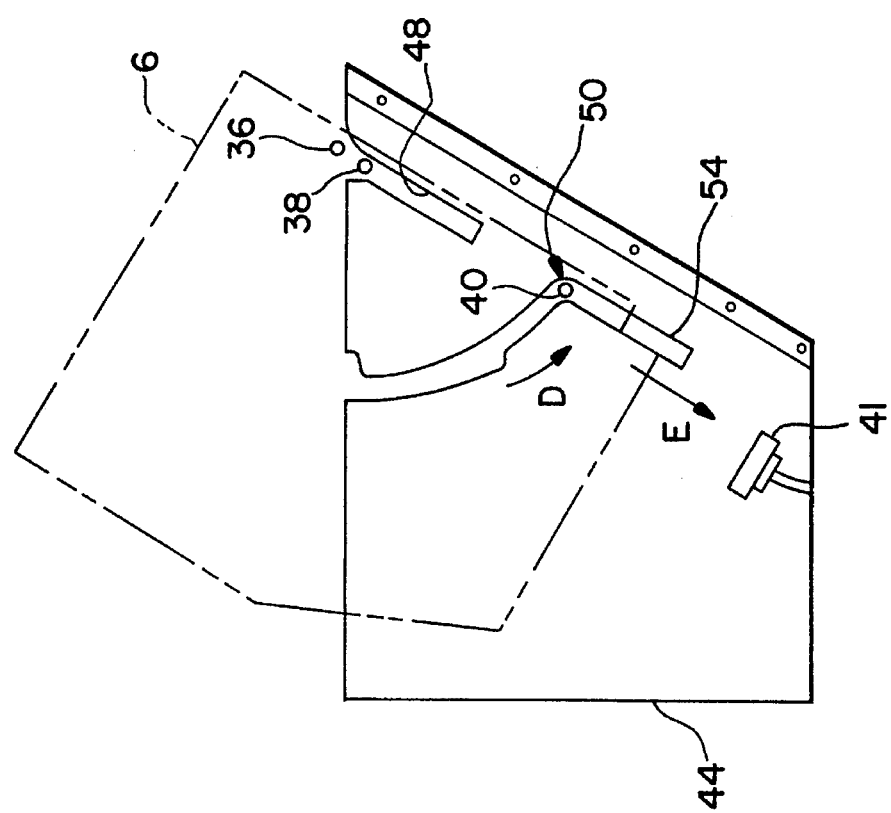
FIG. 4D
FIG. 4C

5,456,468

VIDEO MONITOR INSERTION AND EXTRACTION MACHANISM FOR VIDEO GAME MACHINES

BACKGROUND OF THE INVENTION

The invention relates, generally, to video game machines and, more particularly, to a device for facilitating the insertion and extraction of the video monitor into and out of the video game cabinet.

Video games typically consist of a game cabinet supporting a video monitor and a plurality of player operated buttons. The video monitor displays a game as directed by the game program and the player manipulates the buttons to control play of the game. The player operated buttons preferably consist of video "buttons" displayed on the monitor for screen touch control although electro-mechanical switch buttons located on the cabinet can be used, if desired.

While such video game machines are used to play a wide variety of games, such as games with sporting or fantasy themes, the use of video game machines for gambling purposes has risen dramatically in recent years. Such games are commonly found in casinos and other legalized gambling sites where games such as poker, blackjack, keno and the like are played.

In some video game machines the video display consists of a video monitor arranged with its screen substantially vertical. In other video game machines the screen is arranged at approximately a 30 degree angle relative to the horizontal. These, so called, slant top video game machines are commonly used for gambling applications where the game player sits in front of the machine and the game cabinet is dimensioned somewhat like a desk.

In slant top machines the video monitor is typically lowered into the game cabinet through the top. Because the typical video monitor weighs approximately 50 pounds and is cumbersome to handle, it is very difficult for the game operator to insert and remove the monitor from the cabinet. This poses a significant problem because video monitors are periodically removed for repair and maintenance purposes.

Thus, a video game machine that facilitates the insertion and removal of the video game monitor is desired.

SUMMARY OF THE INVENTION

The video game machine of the invention facilitates the insertion and removal of the monitor and consists of a space located in the game cabinet for receiving the video monitor. Located on either side of the space is a support plate including a pair of tracks. The video monitor is provided with lugs extending from the sides thereof that face the support plates. The lugs engage the tracks in the support plates such that the video monitor is supported and can be lowered into the cabinet gradually with minimum effort and minimum risk of injury to the operator or damage to the monitor. A blind mating connector connects the video monitor to the electric logic for controlling the game.

BRIEF DESCRIPTIONS OF THE DRAWINGS

FIGS. 4a–4d are side views showing the monitor of the invention as it is inserted into the cabinet.

DETAILED DESCRIPTION OF THE INVENTION

Figure 1:
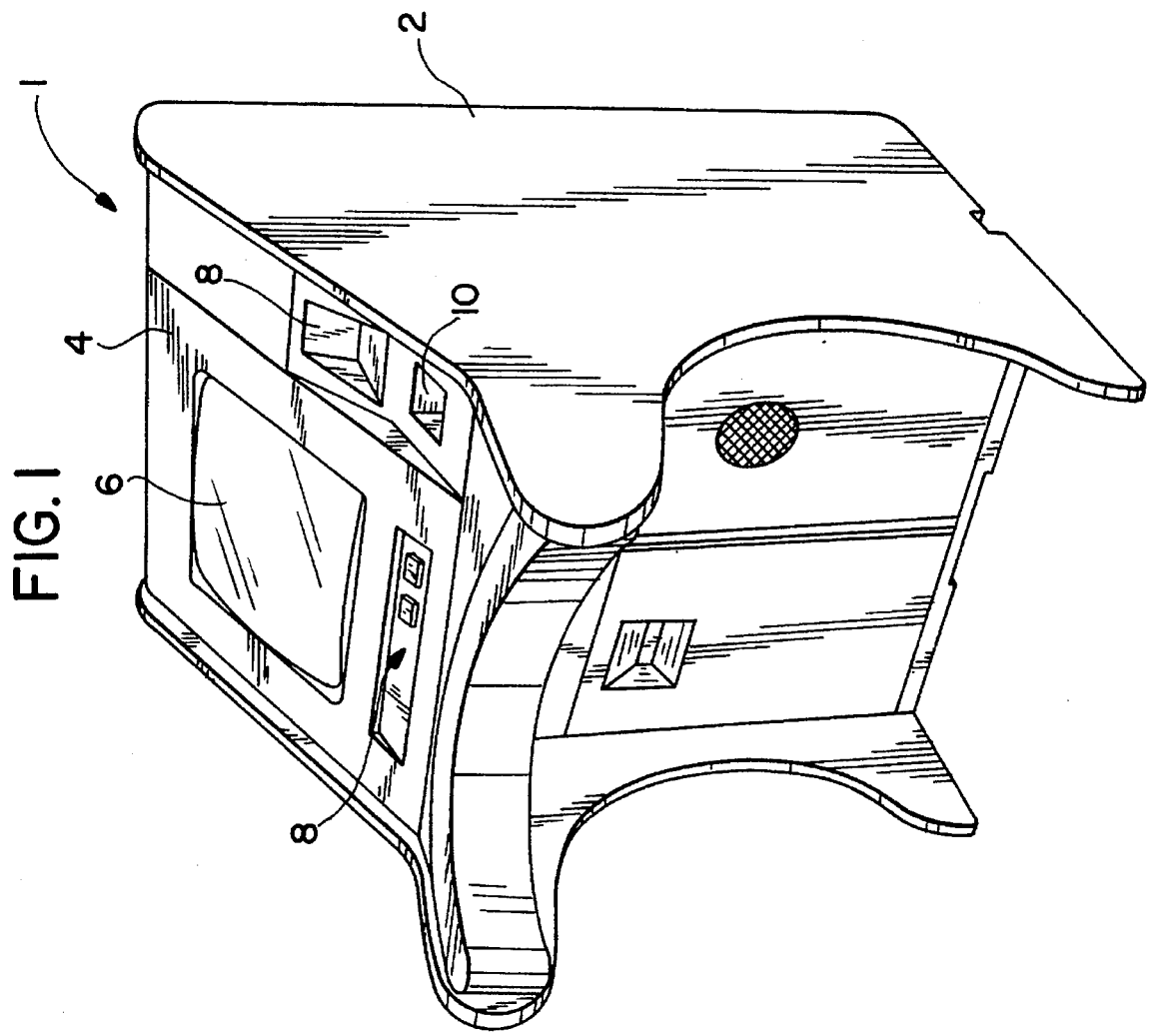
FIG. 1 is a perspective view of a slant top video game machine.

Referring to FIG. 1, the slant top video game machine of the invention is shown generally at 1 consisting of a cabinet 2 having an inclined top 4 under which the video monitor 6 is located. A plurality of player operated switch buttons 8 may be provided on the cabinet 2 allowing the game player to control play of the game. Alternatively, the game can be controlled by "buttons" displayed on the video monitor 6 for screen touch control as will be understood by one skilled in the art. A dollar bill collector 8 and coin trough 10 are provided to receive the player's money and deliver payouts, respectively.

Figure 2:
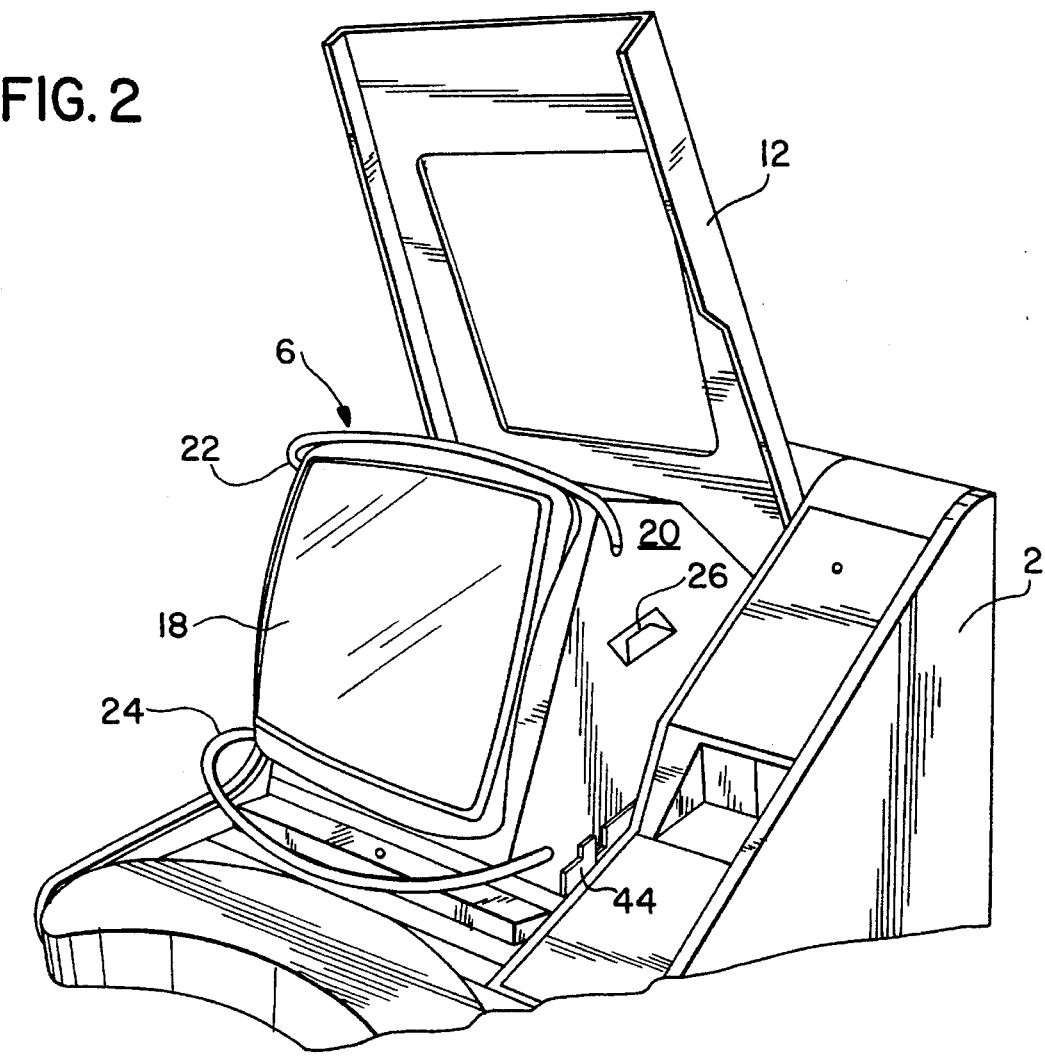
FIG. 2 is a partial perspective view similar to that of FIG. 1 showing the video monitor partially removed from the video game cabinet.

Referring more particularly to FIG. 2, the cabinet top 4 includes a door 12 that can pivot between the closed position of FIG. 1 to the open position of FIG. 2. The door 12 is provided with an aperture 14 that allows the player to view and touch the video monitor 6.

In FIG. 2, the video monitor 6 is shown partially withdrawn from the cabinet 2. The video monitor 6 includes a video screen 18 attached to a protective steel casing 20 which houses the monitor electronics including the high voltage power supply. The steel casing 20 includes two sets of handles, the functions of which will be hereinafter described. The first set of handles consists of a pair of cables 22 and 24 where each cable extends across the monitor and is connected to either side of casing 20. Cable 22 is located at the top edge of the monitor and cable 24 is located at the bottom edge of the monitor.

Figure 6:
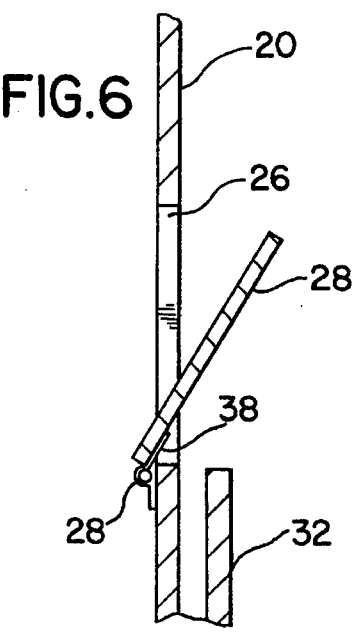
FIG. 6 is a section view taken along line 6—6 of FIG. 3 showing the handle of the invention.

The second set of handles consists of cut out handles 26 located in casing 20 on either side of monitor 6. While only one cut out handle 26 is illustrated it will be appreciated that a second identical handle is located on the opposite side of casing 20. Referring more particularly to FIG. 6, the handle 26 is shown in greater detail. Located in cutout 26 is a protective flap 28 pivotably mounted to casing 20 at pin 28. A torsional spring 38 forces flap 28 outwardly to the position illustrated in FIG. 6. When the monitor is inserted into the cabinet, the flap 28 will protect the operator's fingers from striking the support plates of the cabinet. When the operator's fingers are removed from cut-out handle 26, the support plates 42 and 44 of the cabinet will contact the flaps and overcome the force of spring 30 to close the flaps. The flaps 28 will return to the illustrated open position once the monitor is removed from the cabinet.

Figure 3:
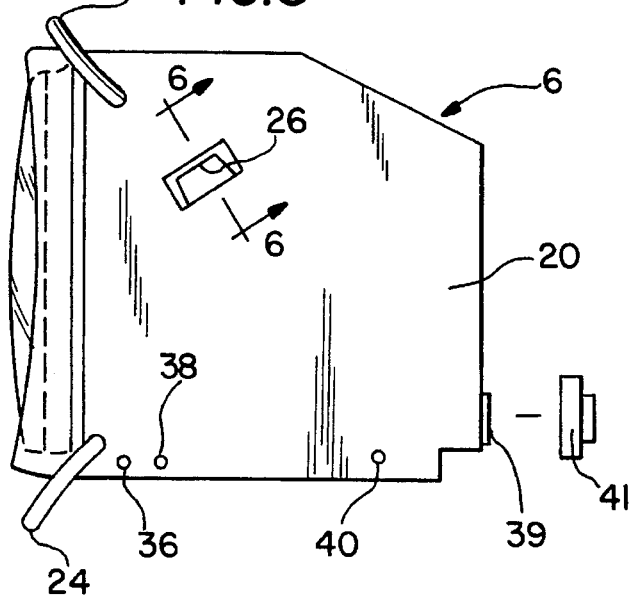
FIG. 3 is a side view of a typical video monitor.

Referring to FIG. 3, one side of monitor 6 is shown where three lugs 36, 38 and 40 extend from casing 20 a short distance. The lugs are arranged along the bottom edge of the casing 20 with lugs 36 and 38 located near the front of the monitor and lug 40 arranged near the rear of the monitor. The specific location of the lugs will be described with reference to FIGS. 4a–4d. While only one side of monitor 66 has been described, it will be appreciated that the opposite side of the monitor is identical. Located on the back of the monitor casing 20 is a blind mating electrical connector 39 for mating with a corresponding connector 41 located in the cabinet.

Figure 5:
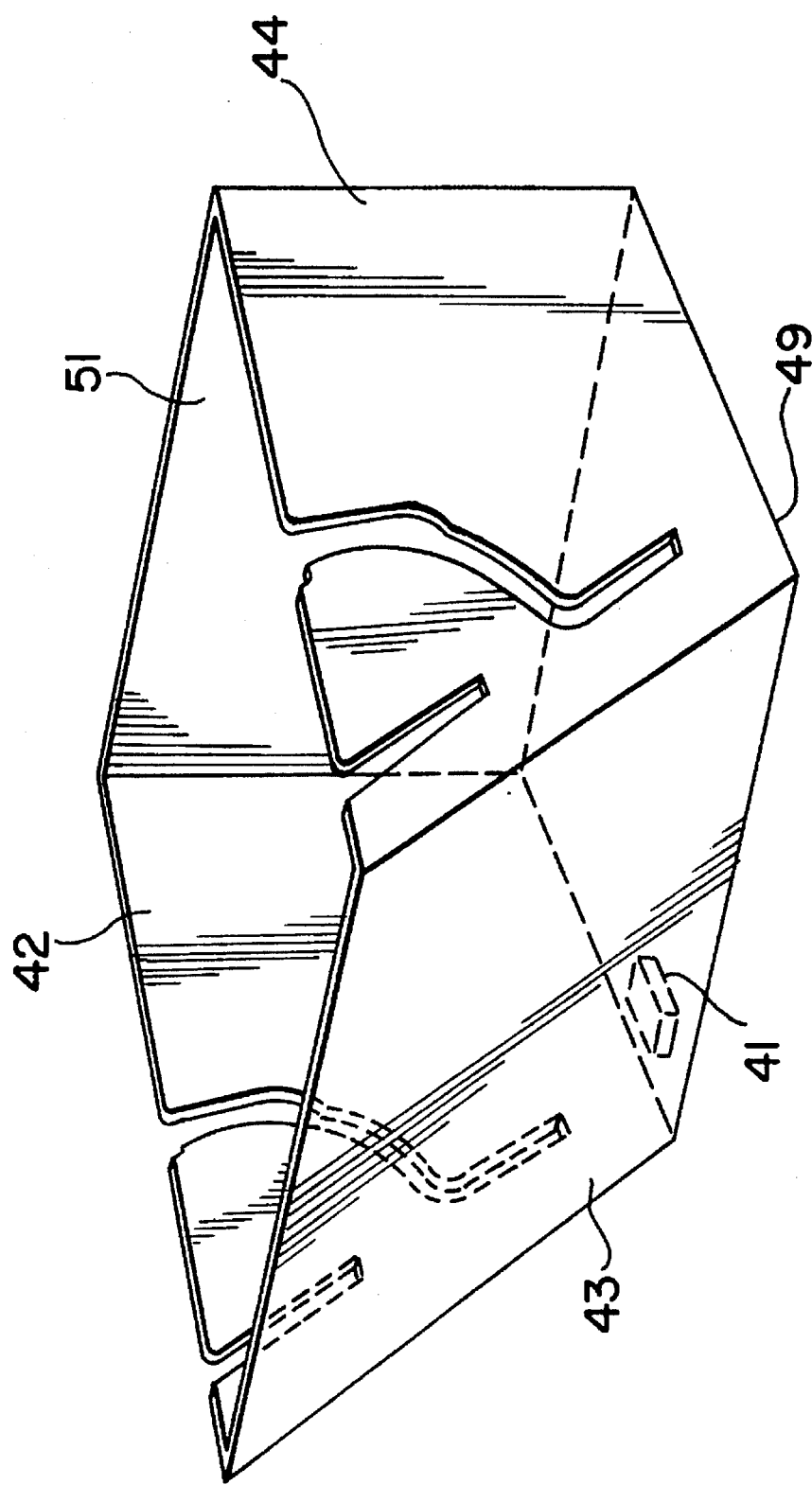
FIG. 5 is a schematic view of the internal cabinet space for receiving the monitor.

Referring to FIGS. 2 and 5, the monitor 6 is located in an internal space 45 in cabinet 2. On either side of internal space are identical support plates 42 and 44. The support plates 42 and 44 are spaced from one another such that the monitor will fit therebetween but the lugs 36, 38 and 40 on the monitor will contact the plates. The internal space is further defined by front wall 43, back wall 51 and bottom 49 where bottom 49 supports electrical connector 41 as best shown in FIG. 5.

Figure 4B:
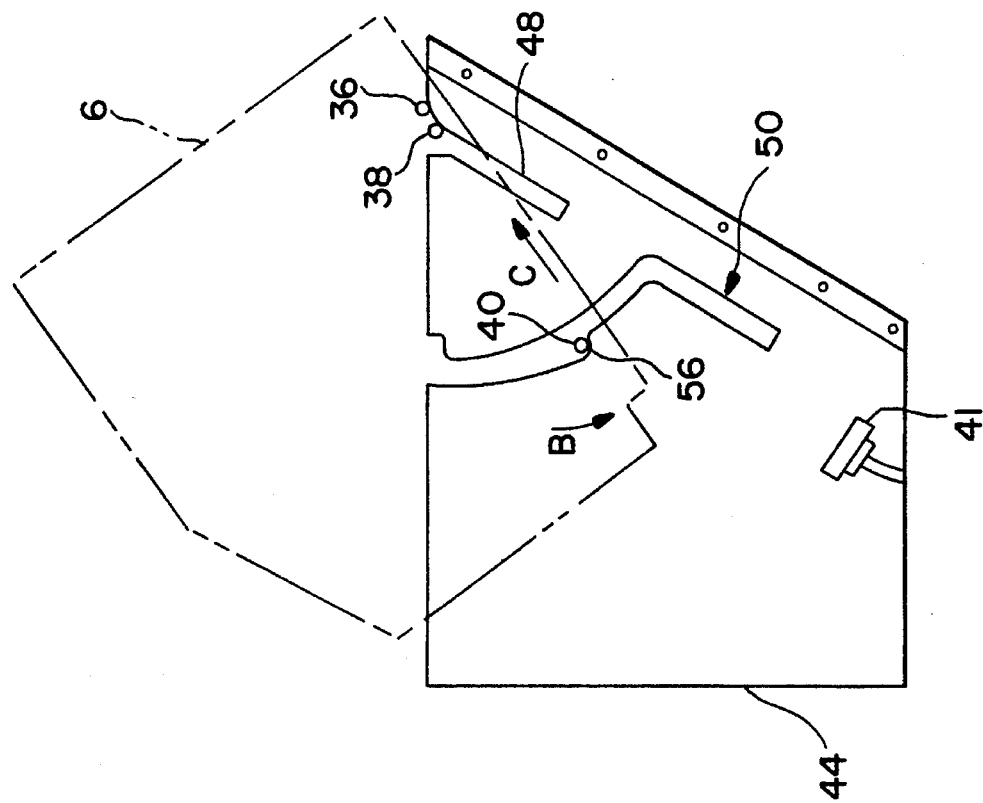
Figure 4A:
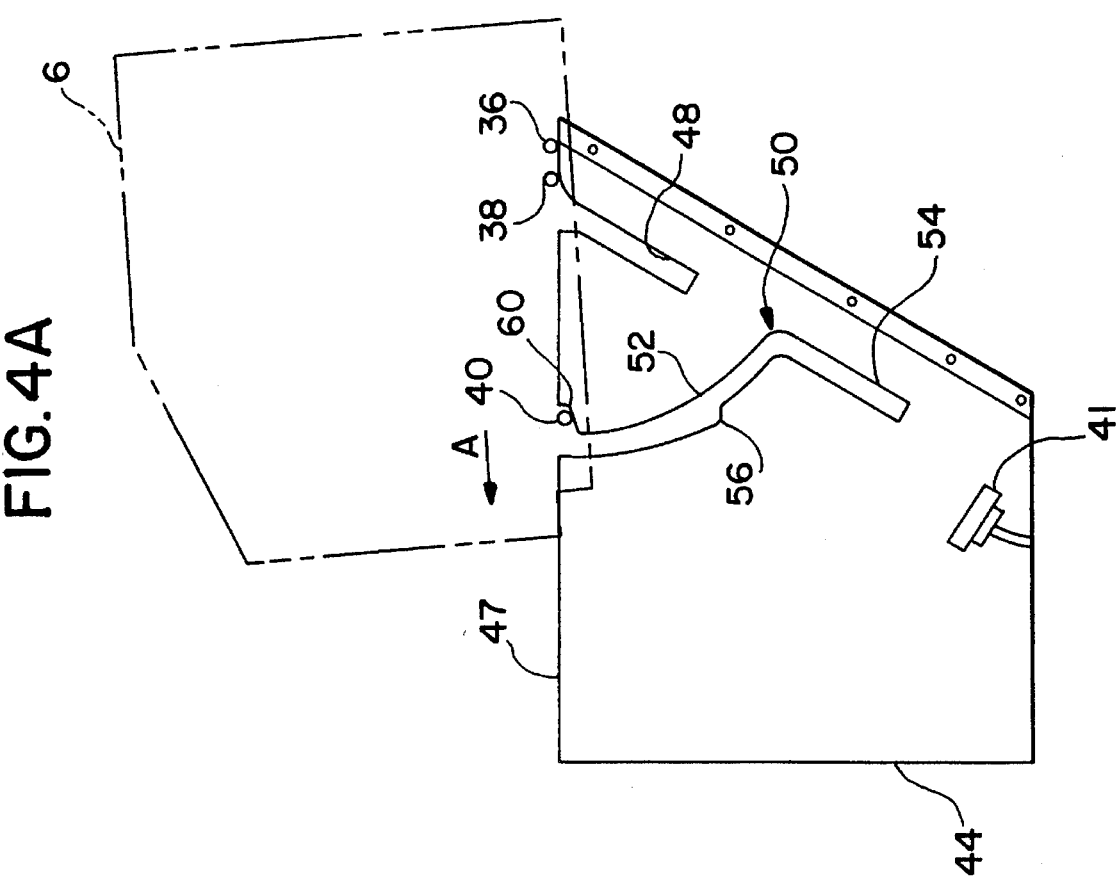

Support plate 44 is shown in detail in FIG. 4a and monitor 6 is shown in dashed line. It will be understood that support plate 42 is identical in structure and operation to plate 44 such that only plate 44 will be described in detail. Support plate 44 includes a first track 48 that is substantially linear and extends at approximately a 60° angle relative to the horizontal top edge 47 of plate 44. A second track 50 is formed in plate 44 behind track 48 and has a complex shape. Track 50 includes a first curved section 52 and a second linear section 54. Curved section 52 comprises essentially an arc of a circle where the center of the arc is approximately the top center of track 48 and includes a recess or lug support 56. Linear section 54 extends from section 52 and is aligned with first track 48.

Referring more particularly to FIGS. 4a–4d, the installation of the monitor in cabinet 2 and the interrelationship between the lugs and the side plates will be described. While only support plate 44 is illustrated and referred to, it is to be understood that the arrangement and operation of support plate 42 is identical and that the insertion steps described with reference to plate 44 occur identically and simultaneously relative to plate 42.

Referring to FIG. 4a, to insert the monitor, the game operator grips cut out handles 26 and sets the monitor in cabinet 2 such that lugs 36, 38 and 40 rest on support plate 44. Lugs 36 and 38 rest on the top edge of plate 44 while lug 40 rests in recess 60 that is contiguous with track 50.

Handles 26 are grasped and monitor 16 is moved backward (as shown by Arrow A in FIG. 4a) until lug 40 is located in track 50. The monitor 16 is pivoted as shown by Arrow B in FIG. 4b until lug 40 engages and rests on recess 56. In this position the handles 26 can be released as the monitor 16 is fully supported by the engagement of the lugs with the side plates.

The operator then grasps cables 22 and 24 and pulls up on the monitor (as shown by Arrow C in FIG. 4b) to release lug 40 from engagement with recess 56. The monitor is then allowed to rotate (as shown by Arrow D in FIG. 4c) until lug 40 is located above track section 54 and lugs 36 and 38 are aligned above track 48.

The monitor is then lowered as shown by Arrow E in FIG. 4c until the lugs 38 and 40 rest on the ends of tracks 50 and 52, respectively, as shown in FIG. 4d. Pressure is then exerted on the monitor in the direction of Arrow E to ensure that the blind mating connectors 39 and 41 are fully engaged. To remove the monitor 6 from the cabinet, the steps described in reference to FIGS. 4a–4d are reversed such that the monitor can easily be removed.

As will be apparent, the monitor mounting structure of the invention allows the monitor to be easily inserted into and removed from the game cabinet while ensuring that the monitor is properly aligned. Moreover, because of the unique shape of the tracks the monitor is fully supported on lugs 36, 38 and 40 at positions intermediate the fully inserted or fully removed position.

While the invention has been described in some detail with reference to the figures, it will be appreciated that numerous changes in the details and construction of the device can be made without departing from the spirit and scope of the invention.

What is claimed is:

1. A Video game machine, comprising:
   a) a game cabinet defining an internal space for receiving a video monitor;
   b) a video monitor;
   c) support and guide means located in said internal space for guiding the manual insertion and removal of the video monitor comprising means for supporting the monitor in a first position where the monitor is substantially removed from said space, a second position where the monitor is substantially inserted in said internal space and an intermediate position between said first and second positions, said support and guide means includes at least one support plate, said at least one support plate including at least one track.
   d) engagement means on the video monitor for engaging said support and guide means.

2. The video game machine according to claim 1, wherein said engagement means includes at least one lug extending from the video monitor for engaging said at least one track.

3. The video game machine according to claim 1, wherein said engagement means includes at least one lug extending from said video monitor for engaging said guide and support means.

4. The video game machine according to claim 1, further including a blind mating connector for electronically connecting the video monitor to the electronic game controls and logic.

5. The video game machine according to claim 1, wherein the support and engagement means includes a support plate, a first track located in said support plate and a second track located in said support plate, said engagement means includes a first lug extending from the monitor for engaging the first track and a second lug extending from the monitor for engaging said second track.

6. The video game machine according to claim 5, wherein said first track is linear and extends at an angle to the horizontal.

7. The video game machine according to claim 5, wherein said second track has a first curvilinear section including a recess for receiving said first lug and a linear section where the linear section is aligned with said first track.

8. The video game machine according to claim 5, further including a third lug for engaging said first track.

9. The video game machine according to claim 5, further including a second support plate identical to said support plate and having first and second tracks and said monitor includes additional lugs for engaging the tracks on the second support plate.

10. The video game machine according to claim 5, wherein said means for supporting includes portions of said first and second tracks that engage said lugs to support the weight of the video monitor.

11. The video game machine according to claim 1, further including first and second sets of handles secured to said monitor.

12. The video game machine according to claim 11, wherein said first set of handles is for supporting the monitor up to said intermediate position and said second set of handles is for supporting the monitor beyond said intermediate point.

13. The video game machine according to claim 11, wherein said first set of handles consists of a first cable and second cable secured to and extending across the front of the monitor.

14. The video game machine according to claim 11, wherein said second set of handles includes cutouts formed in a casing for the monitor.

15. The video game machine according to claim 14, wherein said second set of handles includes means for selectively closing said cutouts to prevent gripping of the cutouts when said monitor is lowered int to the cabinet.

16. The video game machine according to claim 15, wherein said means for closing includes flaps mounted to said casing and biased to an open position where said cutouts can be gripped.

17. The video game machine according to claim 16, wherein said flaps are moved to a closed position where said cutouts can not be gripped by engagement with the cabinet.

18. A video game machine, comprising:
 a) a game cabinet defining a space for receiving a video monitor;
 b) a video monitor having a plurality of lugs extending therefrom;
 c) support and guide means located in said internal space for guiding the insertion and removal of the video monitor into and out of said space comprising:
 a support plate having a first track for receiving one of said plurality of lugs, and a second track for receiving another one of said plurality of lugs, said first and second tracks being arranged such that said lugs slide in said tracks as said monitor is inserted into said space.

19. The video game machine according to claim 18, wherein said first and second tracks are arranged to support the video monitor in a first position where the monitor is removed from said space, a second position where the monitor is fully inserted in said space, and a third position intermediate said first and second positions.

20. A video game machine, comprising:
 a) a game cabinet defining an internal space for receiving a video monitor;
 b) a video monitor having a first lug and a second lug extending therefrom;
 c) support and guide means located in said internal space for guiding the manual insertion and removal of the video monitor comprising:
  i) a first track for receiving said first lug, said first track having a substantially horizontal first section and a substantially linear second section, said second section extending from said first section at an angle relative thereto;
  ii) a second track for receiving said second lug, said second track having a substantially horizontal first section, a curved section extending from said second section and a third section extending from said second section, said third section being disposed at said angle.

21. The video game cabinet according to claim 20, wherein said curved second section includes a portion for supporting said cabinet in a position where the monitor is not fully inserted into said space.

22. A video game machine, comprising:
 a) a game cabinet defining an internal space for receiving a video monitor;
 b) a video monitor;
 c) support and guide means located in said internal space for guiding the manual insertion and removal of the video monitor into and out of said space and for supporting of said monitor at an intermediate position where the monitor is not fully inserted to permit safe insertion and removal;
 d) engagement means on said video monitor for engaging said support and guide means; and
 e) first and second handles secured to the monitor, said second set of handles including means for selectively preventing gripping of the second set of handles when the monitor is lowered into the cabinet.

23. A cabinet mounting system for supporting and guiding a video display monitor between a position in which the display screen thereof is vertically upright and a position wherein the screen is inclined to the horizontal, comprising:
 a unitary rigid support frame comprising a planar bottom wall plate, a pair of like parallel planar side walls extending upwardly along opposite lateral edges of said plate, plural engagement members supported at spaced locations along and extending laterally outwardly of the lower margin of each of said side walls, and means for securing the monitor to said frame; and
 a pair of parallel spaced guide frames adapted to be secured in vertical positions laterally outwardly of said side walls for passage of said support frame therebetween;
 horizontal linear tracks spaced along the upper edges of said guide frames for engaging said engagement members, said tracks adjacent the operationally forward ends thereof communicating with downwardly angulated linear trackways and adjacent the operationally rearward ends thereof with arcuate trackways;
 said arcuate trackways openly communicating with linear trackway portions coaxially aligned with, but spaced between said angulated trackways whereby said engagement members operatively support and guide said support frame horizontally along said linear tracks and downwardly along said angulated and arcuate trackways and trackway portions to effect movement of the monitor and support frame from said upright to said inclined positions and vice versa.

24. The combination of claim 23, and detent means in said tracks adjacent the forward ends of said frames for engaging at least one of said engagement members to arrest said frame against horizontal movement.

25. The combination of claim 24, and additional detent means located intermediate the ends of said arcuate trackways for resting movement of said engagement members therealong.

26. The combination of claim 23, and manually engageable means on said support frame for maintaining manual control of said support frame and monitor throughout its movements.

27. The combination of claim 26, wherein said manually engageable means comprises flexible straps extending across the forward ends of said side walls.

28. The combination of claim 24, wherein said manually engageable means comprises finger engageable openings formed through the upper regions of said side walls.

29. The combination of claim 23, wherein said linear trackways and trackway portions are axially spaced and coaxially arranged in spaced parallelism with the forward edge of said support frames.

30. The combination of claim 23, wherein said linear trackways and trackway portions are arranged along an axis determinative of the inclined position of the monitor.

31. The combination of claim 23, and electrical connector means adjacent one of said guide frames receptive of mating connector means on the monitor when the latter is in its inclined position.

32. A video game machine, comprising:

a) a game cabinet defining an internal space for receiving a video monitor:

b) a video monitor having first and second sets of handles secured thereto.

c) support and guide means located in said internal space for guiding the manual insertion and removal of the video monitor comprising means for supporting the monitor in a first position where the monitor is substantially removed from said space, a second position where the monitor is substantially inserted in said internal space and an intermediate position between said first and second positions; and d) engagement means on the video monitor for engaging said support and guide means.

33. A video game machine, comprising:

a) a game cabinet defining an internal space for receiving a video monitor;

b) a video monitor;

c) first means located in said internal space for guiding the manual insertion and removal of the video monitor comprising means for supporting the monitor in ta first position where the monitor is substantially removed from said space, a second position where the monitor is substantially inserted in said internal space and an intermediate position between said first and second positions;

d) second means on the video monitor for engaging said first means; and e) one of said first or second means including at least one support plate, said at least one support plate including at least one track and the other of said first and second means including at least one lug engageable with said track.

* * * * *